United States Patent [19]

Hösel

[11] 4,393,547
[45] Jul. 19, 1983

[54] METHOD AND APPARATUS FOR THE OUTPUT CONTROL IN A CARDING MACHINE

[75] Inventor: Fritz Hösel, Monchen-Gladbach, Fed. Rep. of Germany

[73] Assignee: Trützschler GmbH & Co. KG, Monchen-Gladbach, Fed. Rep. of Germany

[21] Appl. No.: 203,677

[22] Filed: Nov. 3, 1980

[30] Foreign Application Priority Data

Nov. 3, 1979 [DE] Fed. Rep. of Germany ....... 2944428

[51] Int. Cl.³ .................... D01G 15/40; D01G 15/48; D01H 5/42
[52] U.S. Cl. .................................. 19/105; 19/106 R; 19/240; 19/300
[58] Field of Search .................. 19/105, 106 R, 65 A, 19/300, 240

[56] References Cited

U.S. PATENT DOCUMENTS

| 3,300,817 | 1/1967 | Binder et al. | 19/106 R |
| 3,881,223 | 5/1975 | Brown | 19/106 R |
| 3,950,822 | 4/1976 | Bolli | 19/300 X |
| 4,161,052 | 7/1979 | Erben | 19/105 X |
| 4,257,147 | 3/1981 | Moss | 19/105 X |
| 4,271,565 | 6/1981 | Grunder | 19/106 R |
| 4,321,732 | 3/1982 | Erben | 19/105 X |

FOREIGN PATENT DOCUMENTS

WO81/02029 7/1981 PCT Int'l Appl. ............... 19/106 R
1544813 4/1979 United Kingdom .................. 19/105

Primary Examiner—Louis Rimrodt
Attorney, Agent, or Firm—Spencer & Kaye

[57] ABSTRACT

For controlling the output and the silver density in a carding machine, lot-specific data are determined, then fed into a memory from which the data may be recalled at will and applied to the control of the carding machine.

8 Claims, 2 Drawing Figures

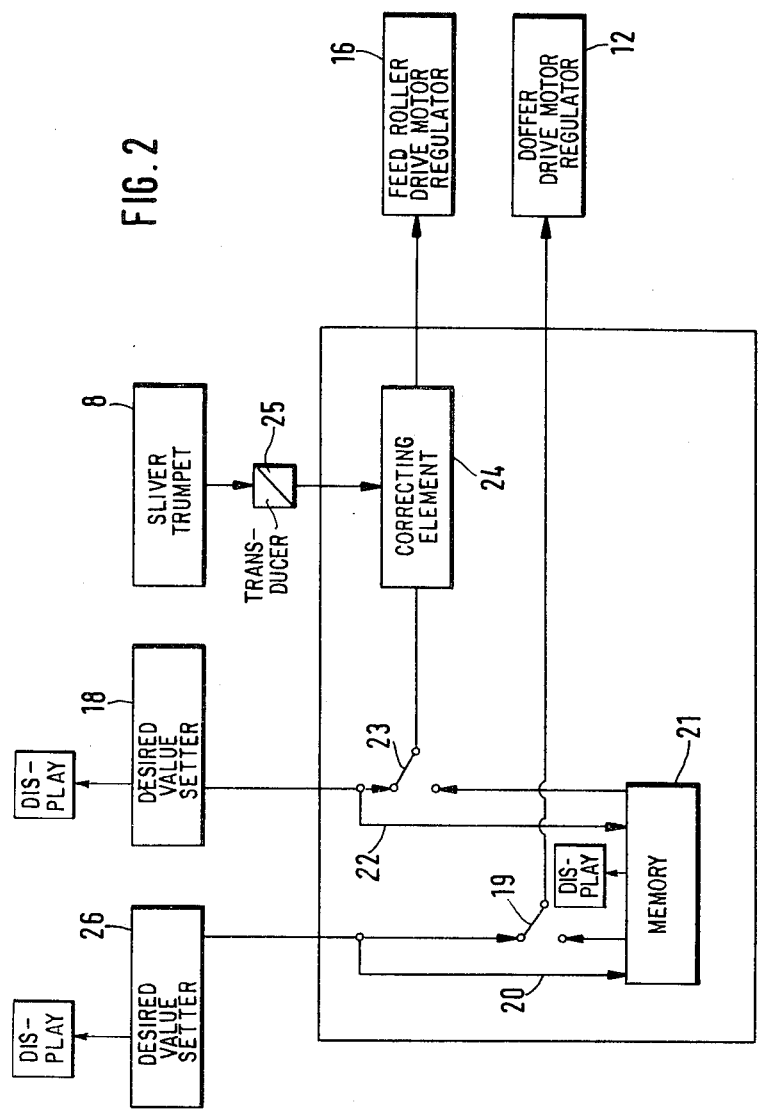

METHOD AND APPARATUS FOR THE OUTPUT CONTROL IN A CARDING MACHINE

BACKGROUND OF THE INVENTION

The present invention relates to a method and an apparatus for controlling the output and regulating the sliver in a carding machine.

One prior art method, for example, determines the basic speed of the feed roller of the carding machine during the first run of a certain lot. When the type of material of the lot changes, the driving gears for the feed roller have to be changed in order to vary the basic speed. The specific type of the material in the lot influences, for example, the possible delivery speed and the tension which both depend, among others, from the speed of the feed roller. Therefore, this method has the drawback that if the composition of a lot is changed, an adaptation of the output and tension control is complicated and time-consuming.

SUMMARY OF THE INVENTION

It is an object of the present invention to provide a method and an apparatus which avoid the above-mentioned drawbacks and which, in particular, permit easy and speedy adaptation of the process control, such as delivery speed and tension, when lots are changed.

This object and others to become apparent as the specification progresses, are accomplished by the invention, according to which, briefly stated, the lot-specific data are determined, then applied to a memory and fed from the memory to the control of the carding machine.

Thus, according to the invention, lot-specific data, such as the delivery speed and the tension, are determined for a certain lot and are recorded in a memory, from which the data can be recalled when desired and fed into the carding machine control in order to regulate, for example, the delivery speed and the tension of the card. This method renders unnecessary almost all the devices required in the prior art method. The method according to the present invention thus permits easy and speedy adaptation of the output control when a lot is changed.

All operational and peripheral data can additionally be stored as lot-specified data. For example, in addition to the data for the fast run which determines the delivery speed, it is also feasible to program and store the speed for the starting run and the slow run. Moreover, there may be stored the data for the sliver lengths for the fill level of the canister as well as for a preliminary signal at which the material transport is automatically switched to slow run.

The method according to the invention can preferably be used for carding machines in which the rpm of the drive motors for the feed roller and the doffer are electronically regulated. Expediently, an electric signal representing a desired value is fed from the memory to a motor control for the doffer to set the delivery speed and further, an electric signal representing a desired value is fed to a motor control for the feed roller for setting the tension.

Preferably, in the method according to the present invention an electric signal derived from the deviation of the card sliver density is superposed on the electric signal fed to the motor control for the feed roller.

The apparatus for practicing the method according to the invention is characterized in that the desired value setting device for the doffer and the desired value setting device for the feed roller are connected with a memory and, when two switches are in a first position, the desired value setting devices are connected with the motor controls for the feed roller and the doffer, whereas when the two switches are in a second position, it is the memory which is connected with the motor controls.

As desired value setters preferably potentiometers are used. Delivery speed and tension may thus be set by two potentiometers. The set values can be read directly on a digital display. Since these values are reproducible, changes of lots are facilitated and accelerated. If the delivery speed is changed, there is no change in tension. In order to change the sliver number, only the tension needs to be adjusted at the respective potentiometer. Since it is not necessary to change gear wheels either for a change in delivery speed nor for a change in tension, operation of the carding machine is facilitated considerably. Further, the optimum delivery speed can be attained rapidly and in a simple manner. For example, three independent delivery speeds can be programmed for increasing the output and efficiency of the carding machine. The set speeds are automatically attained directly from a standstill. If the carding machine has been shut down completely, it can be restarted without positioning the sliver anew, since the cylinder starts and stops in synchronism with the material transport as long as there is sliver in the coiler canister.

The output is determined by the speed of the doffer (m/min). The intake occurs in synchronism and in a certain ratio with the doffing. A change in speed is effected by means of a potentiometer. Preferably, the speed (m/min) is displayed (including all tensions). The optimum value for a particular lot is determined only once; the value is stored and can be recalled at any time, even after several changes of lots.

According to a preferred embodiment, wherein the deviations of the card sliver density from a desired value are measured and corresponding electrical signals are formed which are utilized to regulate the feed roller, a correcting element is disposed between the memory and the electronic motor control for the feed roller, so that the signals characterizing the card sliver deviation influence the correction element.

The weight, that is, the number of a card sliver is determined by the tension between doffer and feed. The tension is set by means of a potentiometer and may be displayed. The required value is determined once, then stored to be recalled at any time. During operation, a comparison takes place between the desired and the actual values and the result of this comparison is a measure for a change in the rate of material intake. This, in case the speed of the doffer remains constant, indirectly amounts to a change in tension.

Preferably a display is associated with the desired value setting device for the doffer and the feed roller. Expediently, the desired value is corrected externally (by means of a potentiometer) so as to equalize the fluctuations. Advantageously, a display (for example, of the digital type) for indicating the set values, such as the number of the sliver, is associated with the memory.

The present invention is not limited to the tension between doffer and feed roller; it also includes the tension between any other two rollers, for example, between the web take-off roller and the doffer, the doffer and the cylinder or the cylinder and the licker-in.

BRIEF DESCRIPTION OF THE DRAWING

FIG. 2 is a block circuit diagram of further detals of the apparatus according to the invention.

DESCRIPTION OF THE PREFERRED EMBODIMENTS

Figure 1:
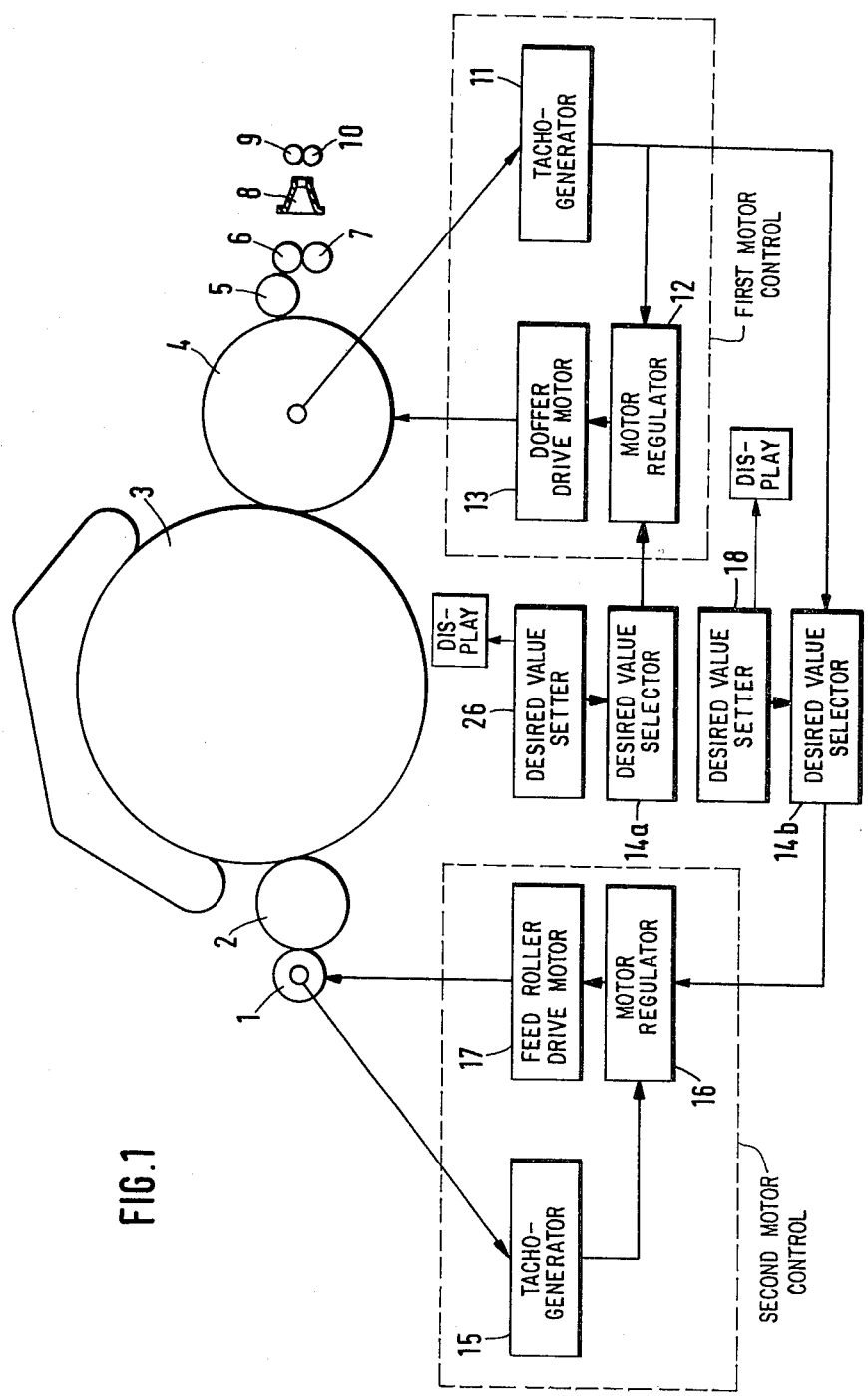
FIG. 1 is a block circuit diagram of an apparatus according to the invention, incorporated in a carding machine.

Turning now to FIG. 1, there is schematically shown a carding machine including a feed roller 1, a licker-in 2, a cylinder 3, a doffer 4, a web take-off roller 5, two squeezing rollers 6, 7, a trumpet 8 and two calender rollers 9, 10. The doffer 4 is associated with a first motor control including an electronic tachogenerator 11, an electronic motor regulator 12 and a motor 13 which drives the doffer 4. The electronic motor regulator 12 includes an rpm regulator with subordinated current regulator. The load portion is designed as a semicontrolled single-phase bridge, for example, of the type disclosed in a brochure No. E 311/1046 issued by the firm Siemens AG and entitled "Regelbare Antriebsmotoren von Werkzeugmaschinen" ("Controllable Drive Motors for Machine Tools"). A desired value setting member 26 (such as a potentiometer) for the doffer 4 is connected to the electronic motor regulator 12 with the intermediary of a desired value selector 14a. The first motor control for the doffer 4 is electrically connected with a second motor control for the feed roller 1 for achieving a synchronous rpm for both the first and the second drive motors. In this arrangement the actual rpm of one drive motor is the desired rpm for the other drive motor. The second motor control includes an electronic tachogenerator 15 associated with the feed roller 1, an electronic motor regulator 16 and a motor 17 driving the feed roller 1. A desired value setting member 18 (such as a potentiometer) for the feed roller 1 is connected to the electronic motor regulator 16 with the intermediary of a desired value selector 14b. The component 18 provides a representation of the desired difference between the rpm's of the motors 13 and 17.

Turning now to FIG. 2, the desired value setting member 26 for the doffer 4 is connected with electronic motor regulator 12 for the doffer 4 by means of a switch 19 if the switch 19 is in a first one of two positions. The desired value setting member 26 is simultaneously connected with a memory 21 by means of a branch 20 for storing the desired value for the doffer 4. If the switch 19 is set into the second one of its two positions, the memory 21 is connected with the electronic motor regulator 12 for the doffer 4. In the second position of the switch 19 the desired value is automatically set with the aid of the memory 21. The desired value setting member 18 for the feed roller 1 is connected with the electronic motor regulator 16 for the feed roller 1 by means of a switch 23 if the latter is in a first one of two positions. Additionally, the desired value setting member 18 is also connected with the memory 21 by means of a branch 22 for storing the desired value for the feed roller 1. If the switch 23 is set into its second position, the memory 21 is connected with the electronic motor regulator 16 for the feed roller 1. In this position, the desired value for the feed roller 1 is set automatically. The desired value selector 14a (FIG. 1) includes the branch 20, the switch 19 and the memory 21; the desired value selector 14b (FIG. 1) includes the branch 22, the switch 23 and the memory 21. In operation, the memory is first enabled by depression of a key to emit a certain desired speed value for the motor control. Then a change is speed (e.g. to one of three delivery speeds) is set automatically after the memory has received the corresponding information, such as the condition of a starting sliver.

FIG. 2 additionally shows elements for regulating the card sliver gathered by the trumpet 8. The fluctuations in the density of the sliver are detected by a measuring element which may be a passive or active pneumatic device incorporated in the trumpet 8. The pressure fluctuations of the pneumatic device are converted into electrical pulses in a measured value transducer 25 which is connected with a correcting element 24 disposed between the switch 23 and the electronic motor regulator 16 for the feed roller 1. In this manner, the desired value for the feed roller 1 is continuously varied corresponding to the fluctuations in the density of the card sliver. By changing the speed of the feed roller 1 accordingly, more or less fiber material is fed to the carding machine resulting in a change of the weight of the card sliver. As further seen in FIG. 2, with the desired value setters 18 and 26 there are connected respective, manually operated potentiometers 30 and 31 for manually correcting the desired value setters 18 and 26 dependent upon fluctuations, for example, in material, temperature or humidity measured in the sliver.

It will be understood that the above description of the present invention is susceptible to various modifications, changes and adaptations, and the same are intended to be comprehended within the meaning and range of equivalents of the appended claims.

What is claimed is:

1. In a carding machine including a doffer, a first motor for driving said doffer, a feed roller and a second motor for driving said feed roller; the improvement comprising an apparatus for controlling the output and the sliver density in said carding machine; said apparatus having
   (a) a first motor regulator connected to said first motor;
   (b) a second motor regulator connected to said second motor;
   (c) a first desired value setter for said doffer, connected to said first motor regulator;
   (d) a second desired value setter for said feed roller, connected to said second motor regulator;
   (e) a memory connected to said first and second desired value setters for feeding setting signals therefrom into said memory;
   (f) a first switch having first and second positions for selectively connecting said first motor regulator to said first value setter or to said memory; and
   (g) a second switch having first and second positions for selectively connecting said second motor regulator to said second value setter or to said memory.

2. A carding machine as defined in claim 1, further comprising
   (h) signal generating means for producing an electric signal representing density variations in the sliver delivered by the carding machine; and
   (i) a correcting element connected to said signal generating means for receiving said signals from said signal generating means; said correcting element being further connected to said second motor regulator and said second switch, whereby said second motor regulator is connected with the intermediary of said correcting element selectively to said second value setter or to said memory dependent upon said positions of said second switch.

3. A carding machine as defined in claim 1, further comprising a display device connected to said first desired value setter.

4. A carding machine as defined in claim 1, further comprising a display device connected to said second desired value setter.

5. A carding machine as defined in claim 1, further comprising a display device connected to said memory; said display device indicating set sliver numbers.

6. A carding machine as defined in claim 1, further comprising manually operable setting means connected to the desired value setters for correcting sliver fluctuations.

7. A method of controlling the output and the sliver density in a carding machine including a feed roller and a doffer each having a motor control, comprising the following steps:

(a) applying signals, representing lot-specific data, from a first desired value setter connected to the motor control for the doffer and from a second desired value setter connected to the motor control for the feed roller to a memory connected to said first and second value setters for storing in said memory information representing lot-specific data;

(b) applying from said memory a first electric signal, representing a desired value, to the motor control for the doffer for setting delivery speeds; and (c) applying from said memory a second electric signal, representing a desired value, to the motor control for the feed roller, for setting a web tension in the carding machine with said first and second electric signals.

8. A method as defined in claim 7, further comprising the steps of generating a third electric signal representing a deviation in the density of the sliver delivered by the carding machine and superposing said third electric signal on said second electric signal for regulating said tension as a function of the sliver density.

* * * * *